United States Patent
Spinney

(10) Patent No.: US 9,982,798 B2
(45) Date of Patent: May 29, 2018

(54) ADJUSTABLE LOCKING MECHANISM FOR A VALVE

(71) Applicant: Inner-Tite Corp., Holden, MA (US)

(72) Inventor: Stephen P. Spinney, Oxford, MA (US)

(73) Assignee: INNER-TITE CORP., Holden, MA (US)

( * ) Notice: Subject to any disclaimer, the term of this patent is extended or adjusted under 35 U.S.C. 154(b) by 146 days.

(21) Appl. No.: 15/067,415

(22) Filed: Mar. 11, 2016

(65) Prior Publication Data

US 2017/0261122 A1     Sep. 14, 2017

(51) Int. Cl.
*F16K 35/10*     (2006.01)

(52) U.S. Cl.
CPC ................... *F16K 35/10* (2013.01)

(58) Field of Classification Search
CPC ...................................................... F16K 35/10
USPC .......... 70/175–180, 198–203, 211, 212, 461; 137/382, 383, 384.8, 385
See application file for complete search history.

(56) References Cited

U.S. PATENT DOCUMENTS

| | | | | |
|---|---|---|---|---|
| 111,943 | A * | 2/1871 | Jones | F16K 35/10 70/178 |
| 206,228 | A * | 7/1878 | Connolly | F16K 35/10 126/295 |
| 1,169,572 | A * | 1/1916 | Schmitt | B60R 25/005 70/200 |
| 1,432,621 | A * | 10/1922 | Rath | F16K 35/10 70/180 |
| 1,530,814 | A * | 3/1925 | Credle | F16K 35/10 70/178 |
| 1,830,667 | A * | 11/1931 | Lolley | F16K 35/10 70/178 |
| 2,099,869 | A * | 11/1937 | Stainbrook | F16K 35/10 70/180 |
| 2,578,547 | A * | 12/1951 | Hilger | E05B 13/001 16/DIG. 2 |
| 3,006,181 | A * | 10/1961 | Sarti | F16K 35/10 70/180 |
| 4,458,510 | A | 7/1984 | Nielsen | |
| 4,630,456 | A * | 12/1986 | Nielsen, Jr. | F16K 35/10 285/80 |
| 4,681,134 | A * | 7/1987 | Paris, Sr. | F16K 35/10 137/382 |
| 5,058,758 | A * | 10/1991 | Suddeth | F16K 35/10 137/382 |
| 5,415,017 | A * | 5/1995 | Benda | F16K 35/10 137/385 |
| 5,664,447 | A | 9/1997 | Neeley | |
| 6,205,826 | B1 | 3/2001 | Neeley | |
| 6,453,707 | B2 * | 9/2002 | Nishimura | F16K 35/10 137/385 |

(Continued)

*Primary Examiner* — Lloyd A Gall
(74) *Attorney, Agent, or Firm* — Grogan, Tuccillo & Vanderleeden, LLP

(57) ABSTRACT

A locking mechanism for restricting access to a valve, the locking mechanism including a locking body and a retaining plate. The locking body is configured to be placed on a valve to restrict access to the valve. The retaining plate is configured to be selectively secured to the locking body via a lock to secure the locking body to the valve. The retaining plate is fixedly movable relative to the locking body so that the locking mechanism may be adjusted to fit valves of varying sizes.

15 Claims, 8 Drawing Sheets

(56) References Cited

U.S. PATENT DOCUMENTS

| | | | | |
|---|---|---|---|---|
| 6,920,894 B1 * | 7/2005 | Nickeas | ................ | F16K 35/06 137/382 |
| 7,114,698 B2 * | 10/2006 | Espinoza | ................ | F16K 35/06 137/385 |
| 8,806,906 B1 * | 8/2014 | Bagby | ................ | F16K 35/06 137/385 |
| 2005/0092367 A1 * | 5/2005 | Espinoza | ................ | F16K 35/06 137/383 |

* cited by examiner

ADJUSTABLE LOCKING MECHANISM FOR A VALVE

The present invention relates generally to locking mechanisms, and more particularly, to a locking mechanism that restricts access to valves of different sizes and/or designs.

BACKGROUND OF THE INVENTION

Utility companies provide utilities, such as water and/or gas, to customers through utility lines that include valves. The valves on a utility line are commonly known as "stops" or "cocks," hereinafter also referred to as "securable valves," and are used to control the flow of utilities, hereinafter also referred to as "utility flow," through utility lines. Such securable valves are well known and generally include a body portion having an inlet and outlet that are separated by a rotatable plug. The plug has a handle or a knob that may be rotated to control utility flow through a utility line.

Valves on a utility line are typically left unsecured unless placed in a closed position so as to prevent utility flow during maintenance operations or to an unauthorized user (e.g., a non-paying customer of the utility).

As will be appreciated, it is generally desirable to secure a valve so that an unauthorized user cannot open the valve and access the utility. Typically, securing a valve involves closing the valve via the handle or knob and using a locking mechanism to partially enclose the valve with a shroud or cover so that the handle or knob cannot be accessed. The cover is secured in place over the valve with, for example, a barrel lock.

A typical utility company may employ a large variety of securable valves having different sizes and/or designs. However, many known locking mechanisms present potential installation difficulties as they do not fit the large variety of securable valves employed in the field. Thus, many utility companies must stock a large inventory of locking mechanism of varying designs and sizes.

With the foregoing concerns in mind, it is an object of the present invention to provide for an adjustable, snug and secure locking mechanism that accommodates a large variety of securable valves, has an improved ease of installation over known locking mechanisms across a wide variety of securable valves, and effectively protects against unauthorized use of a secured valve.

SUMMARY OF THE INVENTION

In an embodiment, a locking mechanism for restricting access to a valve is provided. The locking mechanism includes a locking body and a retaining plate. The locking body is configured to be placed on a valve to restrict access to the valve. The retaining plate is configured to be selectively secured to the locking body via a lock to secure the locking body to the valve. The retaining plate is fixedly movable relative to the locking body so that the locking mechanism may be adjusted to fit valves of varying sizes.

In another embodiment, a method for restricting access to a valve is provided. The method includes placing a locking body on a valve. The locking body is configured to restrict access to the valve. The method further includes selectively securing a retaining plate to the locking body via a lock to secure the locking body to the valve. The retaining plate is fixedly moveable relative to the locking body so that the locking body may be secured to valves of varying sizes.

In yet another embodiment, a locking body for restricting access to a valve is provided. The locking body includes one or more sides that define an interior cavity configured to house a retaining plate configured to be selectively secured to the locking body via a lock to secure the locking body to the valve. The retaining plate is fixedly moveable relative to the locking body so that the locking body may be secured to valves of varying sizes.

DETAILED DESCRIPTION OF THE INVENTION

Figure 1:
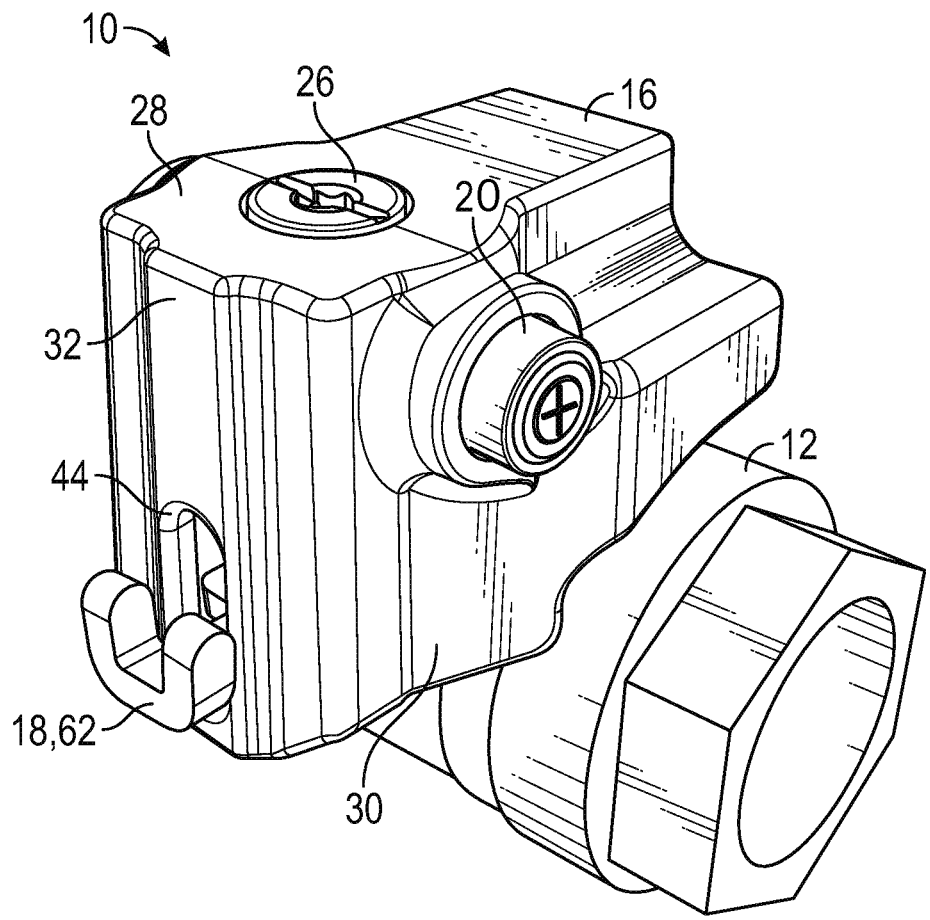
FIG. 1 is a front perspective view of a locking mechanism in accordance with an embodiment of the present invention, wherein the locking mechanism is secured to a valve.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing/assembly tolerances and test measurements. While embodiments of the present invention are described herein as relating to securing gas, water, and/or other utility valves, other embodiments may be configured to secure other types of valves. Moreover, embodiments of the present invention may be mounted on various surfaces, to include the top, side, front, rear, and/or bottom surfaces of a securable valve or other similar structure.

Figure 2:
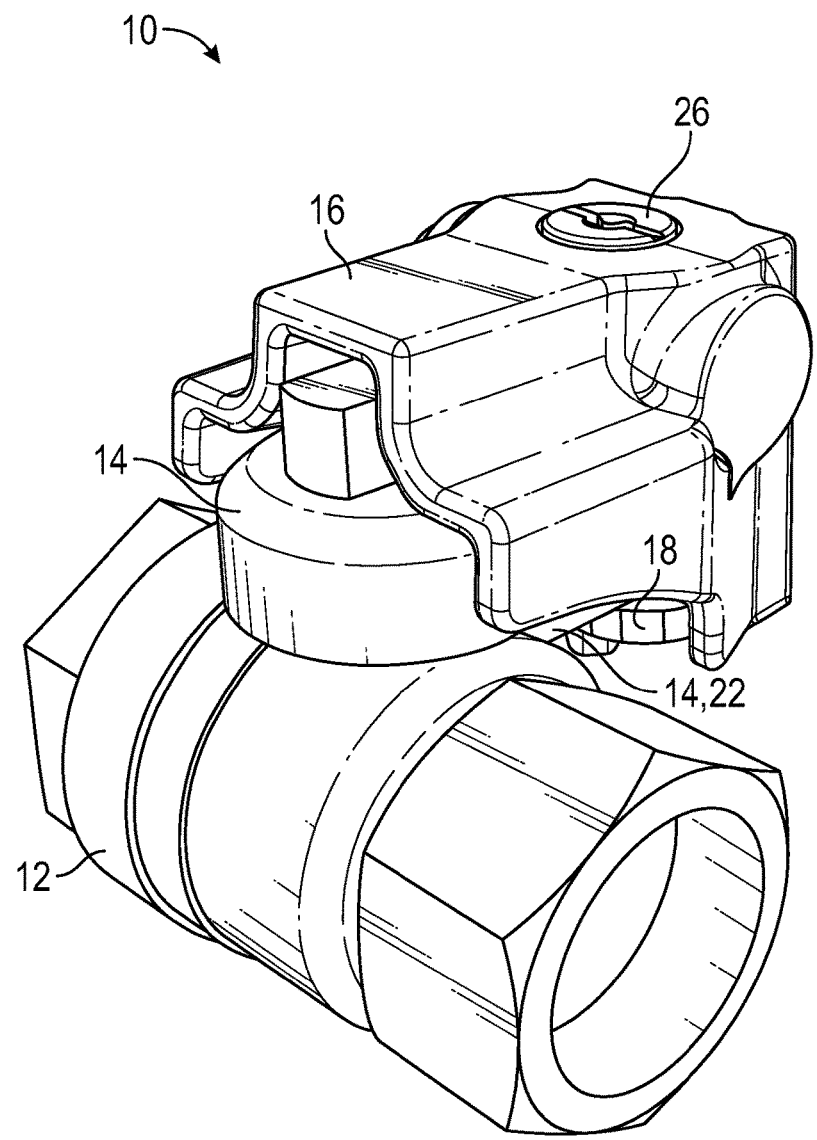
FIG. 2 is a rear perspective view of the locking mechanism of FIG. 1, wherein the locking mechanism is secured to a valve.
Figure 3:
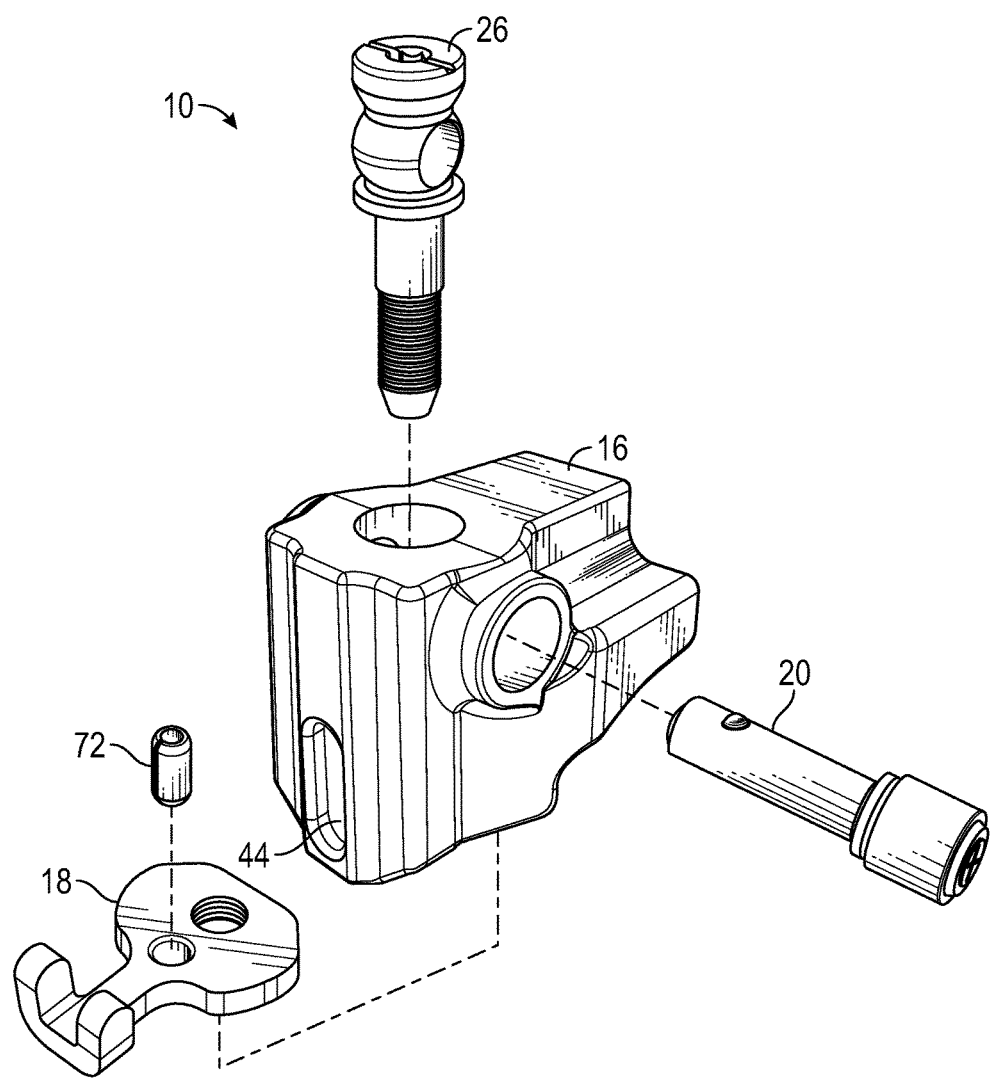
FIG. 3 is an exploded view of the locking mechanism of FIG. 1.
Figure 9:
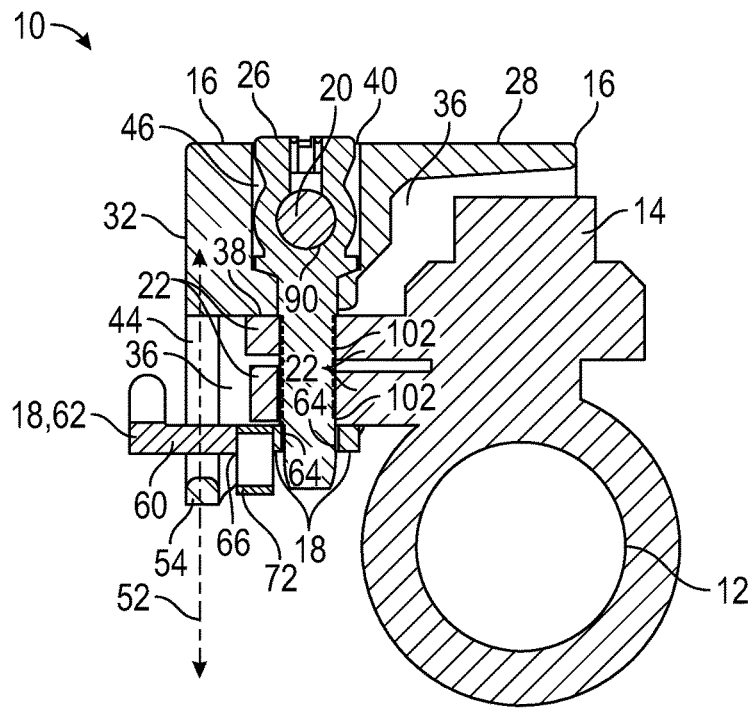
FIG. 9 is a cutaway side view of the locking mechanism of FIG. 1, wherein the locking mechanism is secured to a valve.
Figure 10:
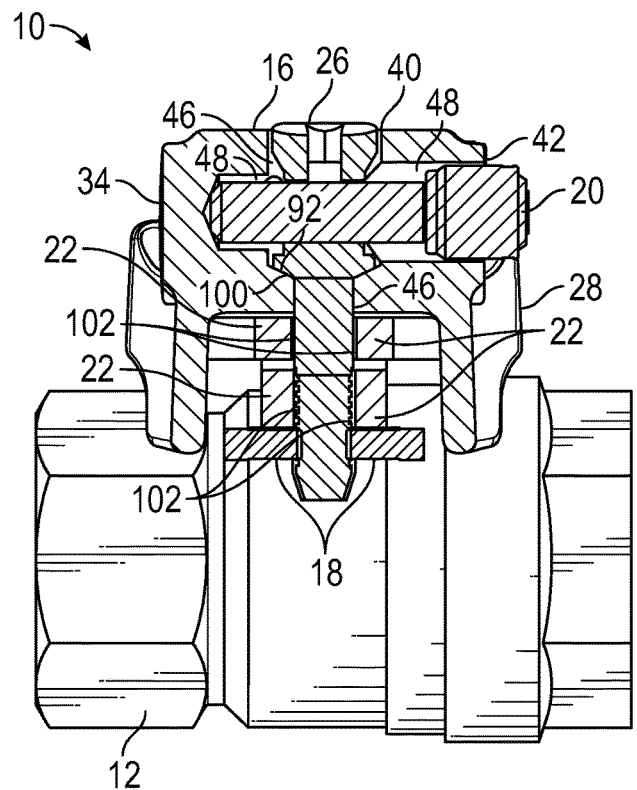
FIG. 10 is cutaway front view of the locking mechanism of FIG. 1, wherein the locking mechanism is secured to a valve.

Referring now to FIGS. 1-3, a locking mechanism 10 for securing a valve 12 in accordance with an embodiment of the invention is shown. As will be appreciated, the locking mechanism 10 secures the valve 12 by restricting access to a handle and/or knob 14 (FIG. 2) of the valve 12. The locking mechanism 10 includes a locking body 16 and a retaining plate 18 disposed within the locking body 16 and configured to be secured to the locking body 16 by a securable pin 26 which is secured to the locking body 16 via an industry standard barrel lock 20. In embodiments, the retaining plate 18 may be selectively secured to the locking body 16 by the lock 20, via the securable pin 26, to secure the locking body 16 to the valve 12. As will be appreciated, the retaining plate 18 is fixedly moveable relative to the locking body 16 so that the locking mechanism 10 may be adjusted to fit valves 12 of varying sizes. For example, the retaining plate 18 may be fixedly moved such that that retaining plate 18 fastens the locking body 16 to a surface 22 of the valve 12, as best seen in FIGS. 2, 9, and 10 and hereinafter also referred to as the valve surface 22. In embodiments, the valve surface 22 may form part of the knob and/or handle 14.

The locking mechanism 10 may further include a securable pin 26 also disposed within the locking body 16 and configured to mate with the retaining plate 18 and to be secured by the lock 20. In such embodiments, securing the securable pin 26 with the lock 20 secures the retaining plate 18 to the locking body 16. For example, the locking mechanism 10 may be secured to the valve 12 by placing the locking body 16 on the valve 12, and installing the retaining plate 18 and securable pin 26 into the locking body 16 such that the retaining plate 18 mates with the securable pin 26. The securable pin 26 is then used to fixedly move the retaining plate 18 in relation to the locking body 16 such that the retaining plate 18 fastens the locking body 16 to the valve surface 22. The lock 20 is then installed into the locking body 16 such that the lock 20 restricts the securable pin 26 from further moving the retaining plate 18 thereby securing the retaining plate 18 to the locking body 16.

Figure 4:
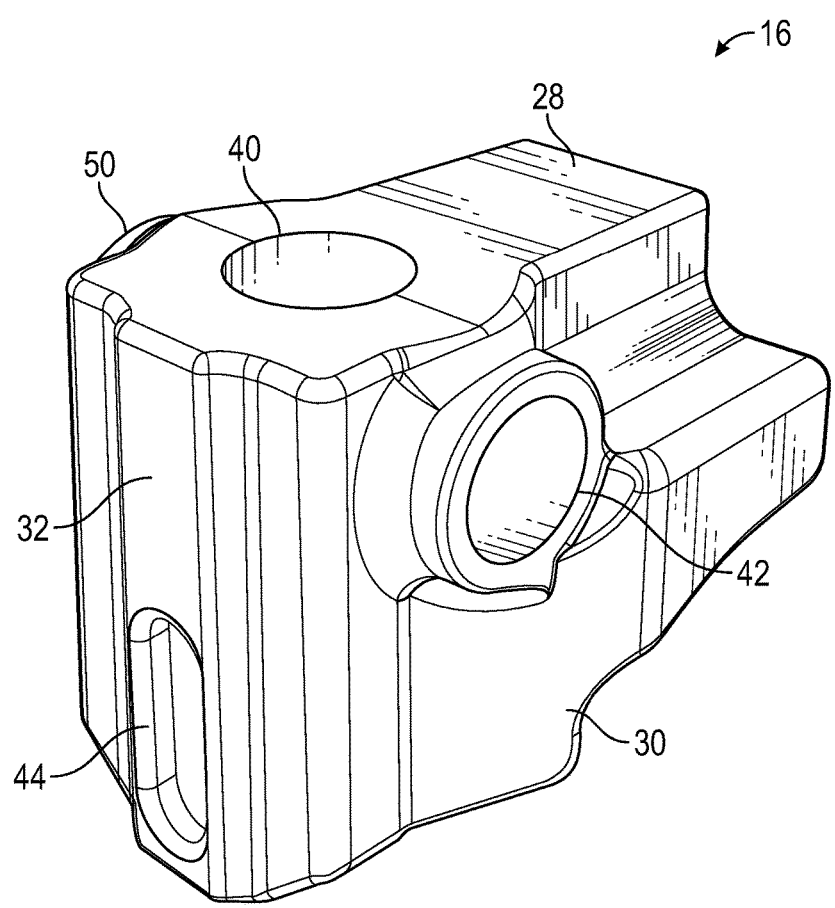
FIG. 4 is a perspective view of a locking body of the locking mechanism of FIG. 1.
Figure 5:
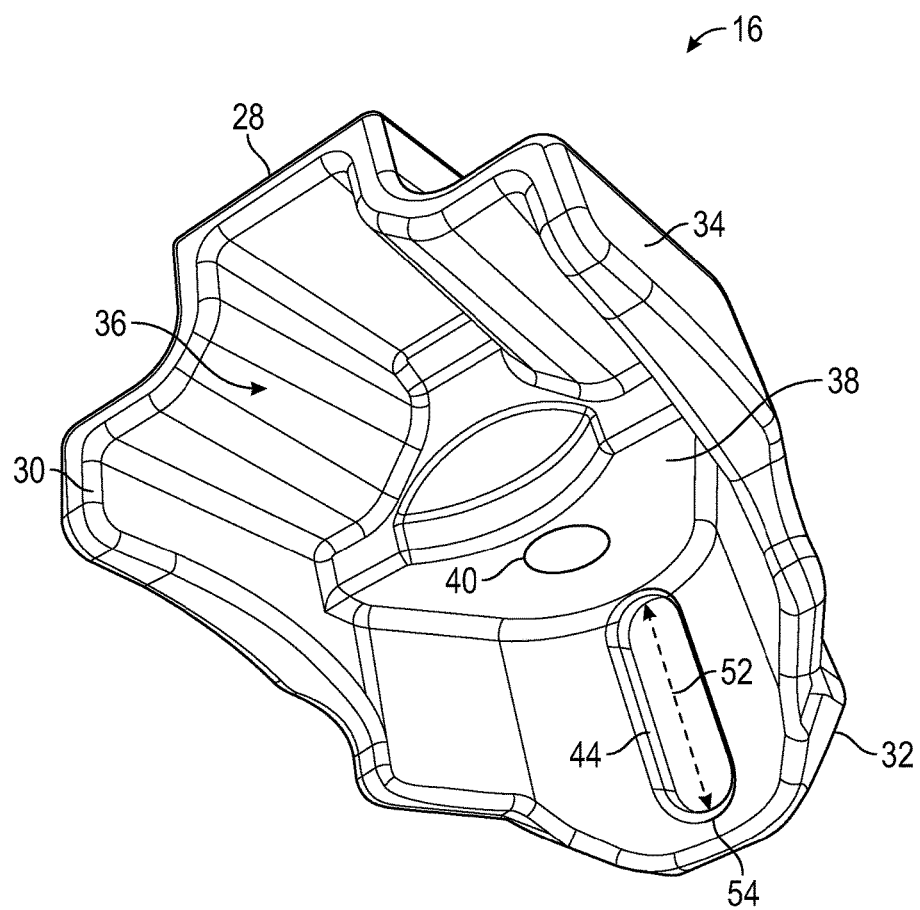
FIG. 5. is another perspective view of the locking body of the locking mechanism of FIG. 1.

As shown in FIGS. 4 and 5, the locking body 16 has one or more exterior sides 28, 30, 32, and 34 that define/form an interior cavity 36. The interior cavity 36 is configured to fit over and/or around the knob and/or handle 14 and/or other valve surface 22 of a valve 12 as best seen in FIGS. 2 and 5. The interior cavity 36 may be further configured to house the retaining plate 18 and may include a wing shelf 38. The wing shelf 38 may be configured to assist the retaining plate 18 in securing the locking body 16 to the valve surface 22.

The locking body 16 may further include a first hole 40 disposed on a first side 28, a second hole 42 disposed on a second side 30, and a slot 44 disposed on a third side 32. Referring briefly to FIGS. 4 and 9, the first hole 40 is configured to receive the securable pin 26 and may be contoured. The first hole 40 allows the securable pin 26 to penetrate the interior cavity 36. In embodiments, the first hole 40 may form a pin channel 46 which houses part of the securable pin 26. In embodiments, the sides 28, 30, 32 and 34 may be flat or curved and may be formed as a single shape. As will be appreciated, the shape of the locking body 16 is configured so that the locking body 16 protects a large variety of valves against tampering attempts. For example, in embodiments, the shape of the locking body 16 protects the front of the valve 12 from tampering.

Turning now to FIGS. 4 and 10, the second hole 42 is configured to receive the lock 20 and may be contoured. In embodiments, the second hole 42 may allow the lock 20 to penetrate the interior cavity 36. In embodiments, the second hole 42 may form a locking channel 48 which may intersect the pin channel 46 formed by the first hole 40. In embodiments, the lock 20 may be an industry standard barrel lock having either a short or long configuration. The lock 20 may be installed as either a left handed or a right handed installation by providing a boss 50 on a fourth side 34 opposite of the second hole 42.

Referring to FIGS. 1, 5 and 9, the slot 44 is configured to allow the retaining plate 18 to protrude from the locking body 16 while additionally allowing the retaining plate 18 ample room to translate in relation to the locking body 16. For example, as best seen in FIGS. 5 and 9, the slot 44 may be elongated such that a longitudinal axis 52 of the slot 44 runs in the same direction as the pin channel 46 formed by the first hole 40. In such embodiments, the retaining plate 18 may move in relation to the locking body 16 along the longitudinal axis 52 of the slot 44. In embodiments, the slot 44 may have a closed bottom 54 defined by the third side 32 such that the slot 44 retains the retaining plate 18 when the retaining plate 18 is not mated to the securable pin 26. While the figures of the present disclosure show embodiments where the slot 44 is closed, other embodiments may employ an unclosed/open slot.

Figure 6:
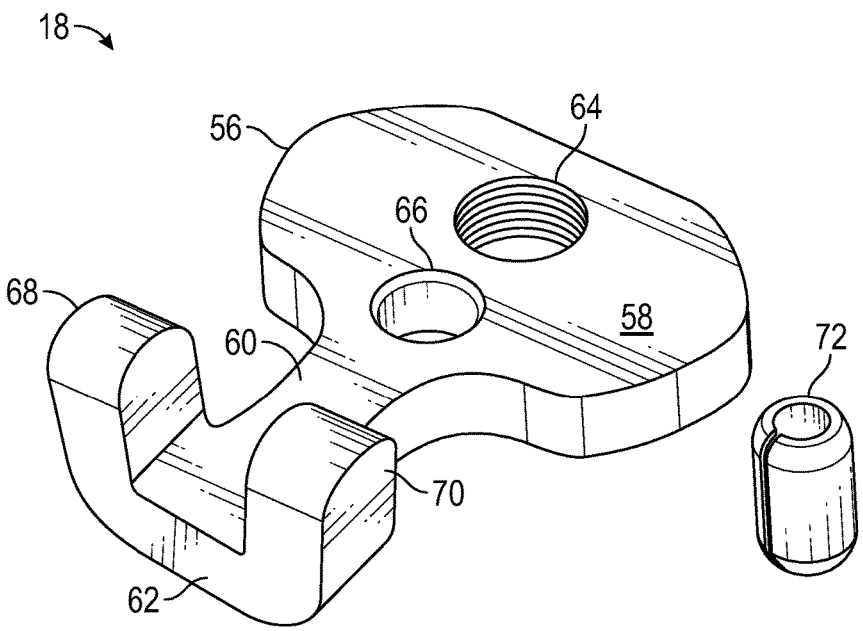
FIG. 6 is a perspective view of a retaining plate of the locking mechanism of FIG. 1.

As illustrated in FIG. 6, the retaining plate 18 includes a body 56 having a surface 58, a neck 60, and a protruding part 62. In embodiments, the retaining plate 18 may further include a threaded aperture 64 and a restraining pin aperture 66. The body 56 of the retaining plate 18 may be configured to mimic the interior of the interior cavity 36 of the locking body 16 in order to prevent prying tools from being introduced between the retaining plate 18 and the locking body 16. The neck 60 is configured to allow ease of installation of the retaining plate 18 into the locking body 16 while at the same time resisting deformation during securing of the locking mechanism 10 onto a securable valve 12. The protruding part 62 may include a first member 68 and a second member 70. The first 68 and the second 70 members may be out of plane with the body 56 of the retaining plate 18. The first 68 and/or second 70 members may provide for a tampering preventative by the use of cutting tools. The retaining plate 18 may be further configured such that the shape of the body 56 and/or the neck 60 restrict rotation of the retaining plate 18 when installed into the locking body 16.

The threaded aperture 64 is configured to receive the securable pin 26. The threads of the threaded aperture 64 may have a fine thread pitch. The restraining pin aperture 66 is configured to receive a restraining pin 72.

Figure 7:
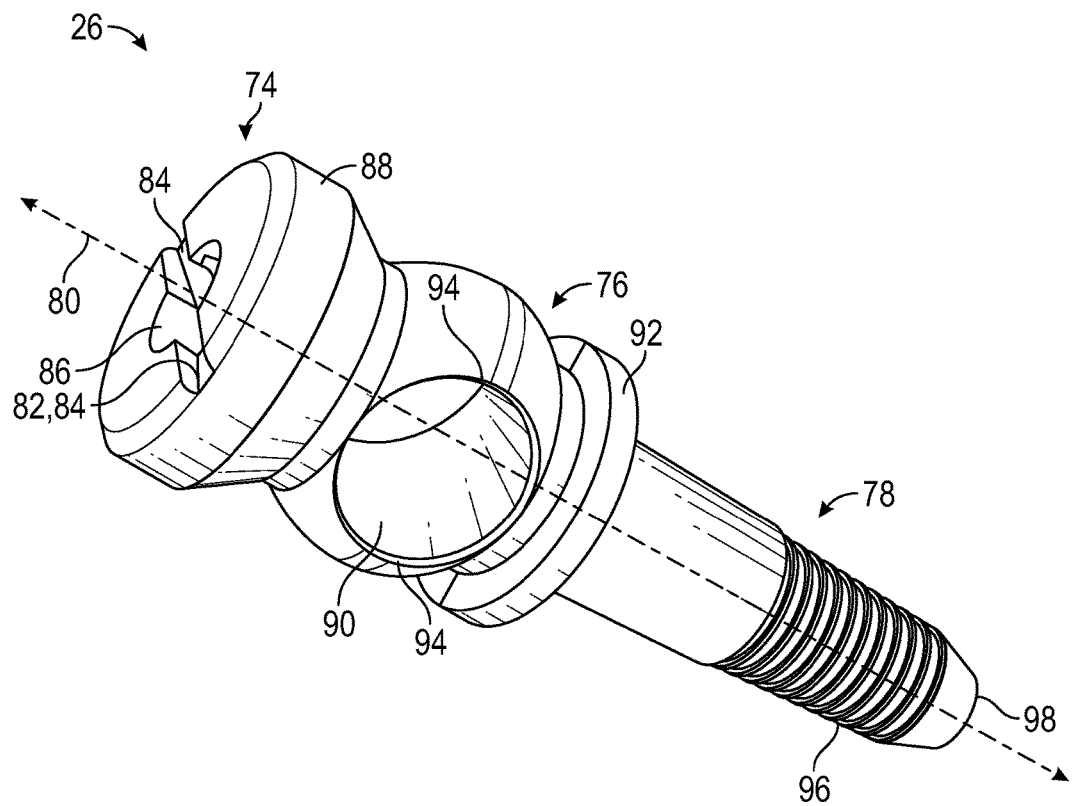
FIG. 7 is a perspective view of a securable pin of the locking mechanism of FIG. 1.
Figure 8:
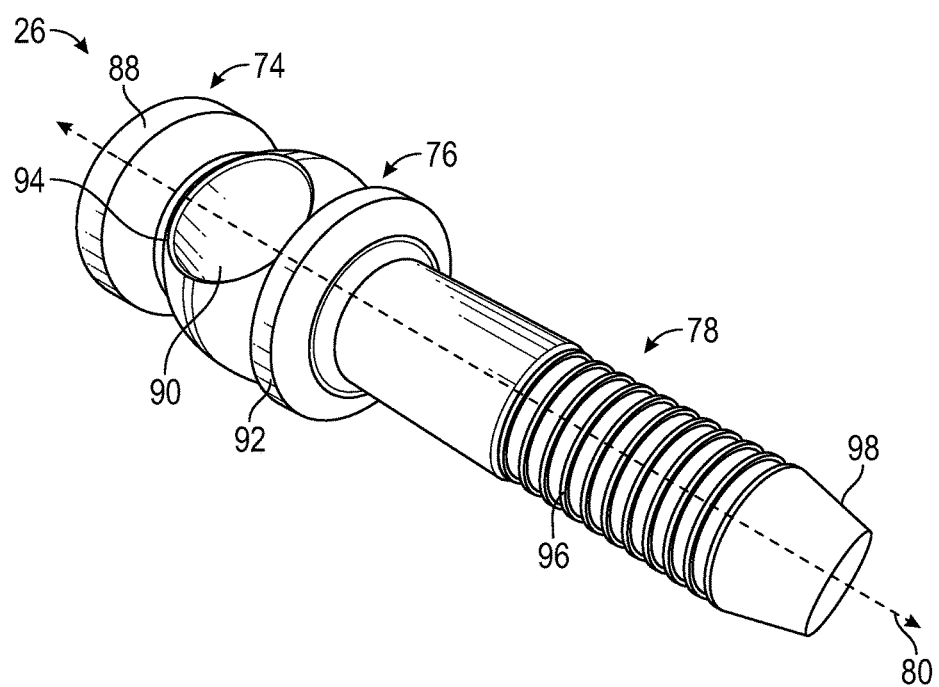
FIG. 8 is another perspective view of the securable pin of the locking mechanism of FIG. 1.

As can be seen in FIGS. 7 and 8, the securable pin 26 includes a head 74, a center section 76, and a shaft 78 disposed along a longitudinal axis 80. The center section 76 may be disposed between the head 74 and the shaft 78.

The head 74 may include an indicator 82 that indicates the rotational orientation of the securable pin 26. In embodiments, the head 74 may be of a multi-tool design. For example, the head 74 may include a slot 84 disposed across the diameter of the head 74. The slot 84 may be configured to allow a thin, flat and/or blunt tool, such as a screw driver, to rotate the securable pin 26 in a clockwise and/or counterclockwise direction about the longitudinal axis 80. In embodiments, the slot 84 may serve as the indicator 82. The head 74 may further include a hex shaped recess 86 configured to allow a hex shaped tool, such as an Allen wrench, to rotate the securable pin 26 in a clockwise and/or counterclockwise direction about the longitudinal axis 80. The head 74 may further include a knurled circumference 88 configured to allow a grasping device, such as human fingers, to rotate the securable pin 26 in a clockwise and/or counterclockwise direction about the longitudinal axis 80.

The center section 76 includes a lock aperture 90 and a bearing surface 92. The center section 76 may be contoured in the area of the lock aperture 90. In embodiments, the center section 76 is configured such that an edge 94 of the lock aperture 90 is generally flat. The flat edge 94 may be formed by machining the lock aperture 90 through the center section 76. The lock aperture 90 is configured to receive the lock 20 and is disposed within the center section 76 such that the lock aperture 90 is aligned with the indicator 82. In other words, the indicator 82 indicates the rotational orientation of the lock aperture 90.

The shaft 78 may include threads 96 and an end taper 98. The shaft 78 is sized to prevent failure of the securable pin 26 during tampering attempts. The threads 96 may have a fine thread pitch. The diameter and thread pitch of the shaft 78 and threads 96 may correspond to the diameter and thread pitch of the threaded aperture 64 of the retaining plate 18.

Turning now to FIGS. 1, 9, and 10, in operation, according to an embodiment, the locking mechanism 10 may be used to restrict access to a valve 12 by placing the locking body 16 onto the valve 12 and installing the retaining plate 18. The retaining plate 18 is then selectively secured to the locking body 16 via the securable pin 26 and lock 20 to secure the locking body 16 to the valve 12. In embodiments, the retaining plate 18 may be fixedly moved in relation to the locking body 16 such that the retaining plate 18 fastens the locking body 16 to a surface 22 of the valve 12 prior to securing the retaining plate 18 with the securable pin 26 and lock 20. In embodiments, the securable pin 26 may also be installed into the locking body 16. In such embodiments, selectively securing the retaining plate 18 to the locking body 16 via the lock 20 may include mating the securable pin 26 to the retaining plate 18 and fixedly moving the retaining plate 18 in relation to the locking body 16 by selectively adjusting the securable pin 26. When the locking body 16 is fastened to the valve surface 22 via the retaining plate 18, the lock 20 may be used to secure the securable pin 26 such that the securable pin 26 is restricted from further moving the retaining plate 18. In some embodiments, the locking body 16 may be first placed over the valve 12 prior to installing the securable pin 26 and/or retaining plate 18. In embodiments, the locking body 16 is placed over the valve 12 such that the wing shelf 38 is pressed against the valve surface 22.

In embodiments, the retaining plate 18 may be installed into the locking body 16 by inserting the retaining plate 18 into the slot 44. The retaining plate 18 may then be manipulated via the protruding part 62 such that the threaded aperture 64 is oriented to receive/mate with the securable pin 26. The protruding part 62 may prevent the retaining plate 18 from falling away from the locking body 16. For example, in embodiments, when the retaining plate 18 is installed in the locking body 16 but not mated to the securable pin 26, the first 68 and/or second 70 members may catch on part of the side 32 that forms the slot 44. In other embodiments, the retaining plate 18 may be inserted in the bottom of the interior cavity 36 of the locking body 16 and manipulated such that the protruding part 62 protrudes from the slot 44. Additionally, in embodiments, the shape of the retaining plate 18 may prevent/self limit the retaining plate 18 from rotating when installed in the locking body 16. For example, as shown in FIGS. 1 and 9, the neck 60 and/or protruding part 62 in combination with the side 32 that forms the slot 44 may prevent the retaining plate 18 from rotating.

Once the retaining plate 18 has been installed into the locking body 16, the restraining pin 72 may be installed into the restraining pin aperture 66. When installed, the restraining pin 72 restrains the retaining plate 18 within the locking body 16. The restraining pin 72 may permanently restrain the retaining plate 18 within the locking body 16 such that the retaining plate 18 becomes non-removable from the locking body 16.

The securable pin 26 may be installed into the locking body 16 by inserting the securable pin 26 into the first hole 40. The securable pin 26 may be inserted into the first hole 40 tapered end 98 first, followed by the center section 76. The head 74 of the securable pin 26 may protrude from or be flush with the opening of the first hole 40. In other embodiments, the head 74 of the securable pin 26 may be accessible via the first hole 40. In embodiments, the bearing surface 92 for the securable pin 26 may seated against a bearing surface 100 of the first hole 40. In embodiments, the bearing surface 100 of the first hole 40 may be formed by the pin channel 46 and/or the locking channel 48.

Mating the retaining plate 18 to the securable pin 26 may include rotating the securable pin 26 such that the threads 96 of the shaft 78 of the securable pin 26 mate with the threaded aperture 64 of the retaining plate 18. In embodiments, the protruding part 62 may be used to adjust the retaining plate 18 in relation to the securable pin 26 during mating. For example, in embodiments, a technician installing the locking mechanism 10 on a valve 12 may grab the protruding part 62 with their hand and then use the protruding part 62 to lift the retaining plate 18 into place (e.g., against the tapered end 98 of the securable pin 26). With the retaining plate 18 held in place via the protruding part 62, the technician can easily mate the retaining plate 18 to the securable pin 26 within the interior cavity 36 of the locking body 16. In embodiments, the tapered end 98 may aid in the alignment of the securable pin 26 with the retaining plate 18. In embodiments, the securable pin 26 may be passed through and/or penetrate a securing hole 102 of the valve surface 22. Once the retaining plate 18 has been mated to the securable pin 26, the securable pin 26 may be used to move the retaining plate 18 in relation to the locking body 16.

Moving the retaining plate 18 in relation to the locking body 16 via selectively adjusting the securable pin 26 may include moving the retaining plate 18 along the longitudinal axis 52 towards the wing shelf 38. In embodiments, moving the retaining plate 18 via the securable pin 26 may include rotating the securable pin 26 in a clockwise and/or counter-clockwise direction about longitudinal axis 80. In such embodiments, rotation of the securable pin 26 causes the retaining plate 18 to move towards the wing shelf 38 via the threads 96 of the securable pin 26 and the threaded aperture 64 of the retaining plate 18. In embodiments where the head 74 of the securable pin 26 has a multi-tool design, a flat headed screwed driver, Allen wrench, or other similar tool, may be used to rotate the securable pin 26.

In embodiments where the interior cavity 36 of the locking body 16 has a wing shelf 38, the retaining plate 18 may be moved so that the surface 58 of the retaining plate 18 presses the valve surface 22 into the wing shelf 38. As will be appreciated, the distance between the retaining plate 18 and the locking body 16 can be adjusted by selectively adjusting the securable pin 26. Accordingly, selectively adjusting the securable pin 26 allows the locking mechanism 10 to accommodate valves 12 having surfaces 22 of different shapes or sizes.

Once the locking body 16 has been fastened to the valve surface 22 by the retaining plate 18, the retaining plate 18 is secured to the locking body 16 via the securable pin 26. In some embodiments, the retaining plate 18 may be secured to the locking body 16 by securing the securable pin 26 with the lock 20. For example, in such embodiments, the lock 20 is installed into the locking body 16 and secures the securable pin 26 such that the securable pin 26 is restricted from further moving the retaining plate 18 in relation to the locking body 16. In embodiments, prior to being secured, the securable pin 26 may be rotated so that the indicator 82 indicates that the lock aperture 90 is aligned with the second hole 42. For example, in embodiments where the slot 84 of the head 74 of the securable pin 26 is the indicator 82, the securable pin 26 may be rotated until the slot 84 indicates that the lock aperture 90 is aligned with the second opening 42. Accordingly, and as will be appreciated, in embodiments where the lock 20 is a barrel lock, or other similar locking device, the lock 20 may be installed into the second hole 42 such that it is received by the lock aperture 90. In embodiments, the lock 20 may pass completely through the lock aperture 90. The lock 20 may be "locked" via a physical key and/or an electronic key. When "locked," the lock 20 is restricted from being removed from the locking body 16. In embodiments, the flat edge 94 left by the machining of the lock aperture 90 eliminates a translation of the lock once the lock 20 is installed completely into the locking body 16.

After being installed/mounted to a valve 12, the locking mechanism 10 may be removed from the valve 12 by removing the lock 20, and loosing the retaining plate 18. In embodiments, the retaining plate 18 may be loosened via the securable pin 26 until the retaining plate 18 no longer fastens the locking body 16 to the valve surface 22. In embodiments, the securable pin 26 may be rotated until the retaining plate 18 becomes detached and drops away from the securable pin 26. In embodiments, the protruding part 62 catches on the slot 44 and prevents the retaining plate 18 from falling to the ground. Accordingly, the protruding part 62 prevents against accidental loss of the retaining plate 18.

It is to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope. For example, in embodiments, the locking mechanisms 10 may only include a retaining plate 18 configured to be fixedly moved via the protruding part 62 and secured by the lock 20. In such embodiments, the retaining plate 18 may have a second neck or a second protruding part that extends into and/or through the pin channel 46 and which can be used to fixedly move the retaining plate 18 in relation to the locking body 16.

As disclosed herein, the present invention advantageously provides for a single locking mechanism 10 that can be adjusted to accommodate/secure a variety of valves 12 that may be employed by a utility company. Moreover, the shape of the locking body 16 and the manner in which the locking body 16 is secured to a valve 12 allows the locking mechanism 10 to be easily installed/mounted to a wide variety of valves. Further, the ability to secure the securable pin 26 with a lock 20 enables the locking mechanism 10 to selectively secure/restrict access to a variety of valves 12.

Additionally, the fine threaded pitch of the threads 96 of the securable pin 26 and the threaded aperture 64 of the retaining plate 18 allow the lock aperture 90 to be oriented to the second contoured hole 42 of the locking body 18 without over/excessive tightening or leaving the locking body 18 with a loose fit when installed/mounted onto the valve 12.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted based on 35 U.S.C. § 112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A locking mechanism for restricting access to a valve, the locking mechanism comprising:
   a locking body configured to be placed on a valve to restrict access to the valve;
   a retaining plate configured to be selectively secured to the locking body via a barrel lock to secure the locking body to the valve;
   a securable pin that includes a lock aperture configured to receive the barrel lock; and
   wherein
      the retaining plate is fixedly movable relative to the locking body so that the locking mechanism may be adjusted to fit valves of varying sizes, and
      the securable pin is configured to be installed into the locking body and mated with the retaining plate such that selectively adjusting the securable pin fixedly moves the retaining plate.

2. The locking mechanism of claim 1, wherein the securable pin includes an indicator that indicates an orientation of the lock aperture.

3. The locking mechanism of claim 1, wherein the securable pin is configured to penetrate an opening of the valve before being mated to the retaining plate.

4. The locking mechanism of claim 1, wherein the securable pin has a head having a multi-tool design.

5. The locking mechanism of claim 1,
wherein the locking body comprises:
a slot configured to allow a protruding part of the retaining plate to protrude from the locking body.

6. The locking mechanism of claim 5, wherein the protruding part is configured to retain the retaining plate within the locking body.

7. The locking mechanism of claim 5, wherein the retaining plate is unable to rotate when the protruding part protrudes from the locking body.

8. The locking mechanism of claim 1, wherein the retaining plate includes a restraining pin aperture configured to receive a restraining pin that restrains the retaining plate within the locking body.

9. A method for restricting access to a valve, the method comprising:
placing a locking body on a valve, the locking body configured to restrict access to the valve;
selectively securing a retaining plate to the locking body via a lock to secure the locking body to the valve; and
wherein
the retaining plate is fixedly moveable relative to the locking body so that the locking body may be secured to valves of varying sizes, and
selectively securing the retaining plate to the locking body via the lock to secure the locking body to the valve comprises:
mating a securable pin to the retaining plate by penetrating an opening of the valve with the securable pin; and
fixedly moving the retaining plate by selectively adjusting the securable pin.

10. The method of claim 9, wherein fixedly moving the retaining plate by adjusting the securable pin comprises:
adjusting the securable pin so that an indicator of the securable pin indicates that a lock aperture of the securable pin is oriented to receive the lock;
wherein the lock is a barrel lock.

11. The method according to claim 9,
wherein the locking body comprises a slot that allows a protruding part of the retaining plate to protrude from the locking body.

12. The method according to claim 9, the method further comprising:
installing a restraining pin into a restraining pin aperture of the retaining plate, the restraining pin configured to restrain the retaining plate within the locking body.

13. A locking body for restricting access to a valve, the locking body comprising:
one or more sides that define an interior cavity configured to house a retaining plate configured to be selectively secured to the locking body via a lock to secure the locking body to the valve;
a first opening configured to receive a securable pin that mates with the retaining plate such that the retaining plate is fixedly moved by selectively adjusting the securable pin; and
wherein the retaining plate is fixedly moveable relative to the locking body so that the locking body may be secured to valves of varying sizes.

14. The locking body of claim 13, wherein the locking body further comprises:
a second opening configured to receive the lock;
wherein the lock is a barrel lock.

15. The locking body of claim 13, wherein the locking body further comprises:
a slot configured to allow a protruding part of the retaining plate to protrude from the locking body.

* * * * *